United States Patent
Qiang et al.

(10) Patent No.: US 12,375,760 B2
(45) Date of Patent: *Jul. 29, 2025

(54) METHODS AND APPARATUS TO MONITOR DIGITAL MEDIA

(71) Applicant: The Nielsen Company (US), LLC, New York, NY (US)

(72) Inventors: Bo Qiang, Lutz, FL (US); Jone M. Burr, Palm Harbor, FL (US); Lois Price, Tampa, FL (US); Scott L. Brown, Clearwater, FL (US); Chris Nicotra, Holiday, FL (US); Arun Ramaswamy, Tampa, FL (US); Matthew M. Campbell, Tampa, FL (US); Kevin K. Gaynor, Sunnyvale, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,471

(22) Filed: Oct. 25, 2023

(65) Prior Publication Data

US 2024/0121472 A1    Apr. 11, 2024

Related U.S. Application Data

(63) Continuation of application No. 17/947,997, filed on Sep. 19, 2022, now Pat. No. 11,838,584, which is a continuation of application No. 17/135,983, filed on Dec. 28, 2020, now Pat. No. 11,451,867, which is a continuation of application No. 16/234,528, filed on Dec. 27, 2018, now Pat. No. 10,880,600.

(51) Int. Cl.
| | |
|---|---|
| *H04H 60/32* | (2008.01) |
| *H04N 21/442* | (2011.01) |
| *H04N 21/81* | (2011.01) |

(52) U.S. Cl.
CPC .. *H04N 21/44213* (2013.01); *H04N 21/44224* (2020.08); *H04N 21/812* (2013.01)

(58) Field of Classification Search
CPC ....... H04N 21/44213; H04N 21/44224; H04N 21/812; H04N 21/254; H04N 21/6582
USPC ......................................................... 725/14
See application file for complete search history.

(56) References Cited

U.S. PATENT DOCUMENTS

| | | | |
|---|---|---|---|
| 9,239,747 B1 * | 1/2016 | Kulick | G06F 16/5866 |
| 10,536,741 B1 * | 1/2020 | Madison | H04N 21/8456 |
| 2008/0154401 A1 * | 6/2008 | Wang | G11B 27/11 |
| | | | 700/94 |

(Continued)

*Primary Examiner* — Benjamin R Bruckart
*Assistant Examiner* — Sahar Aqil Riaz

(57) ABSTRACT

Methods, apparatus, systems and articles of manufacture to monitor media are disclosed. An example apparatus includes memory; computer readable instructions; and processor circuitry to execute the computer readable instructions to: generate a plurality of errors by comparing (a) a plurality of watermarks adjusted by offsets and (b) reference data, the adjusted watermarks corresponding to watermark data with inaccurate timing information for media; identify an offset of the offsets based on the plurality of errors; and adjust timing information of a watermark of the watermarks using the offset to increase an accuracy of the timing information.

20 Claims, 5 Drawing Sheets

(56) References Cited

U.S. PATENT DOCUMENTS

| | | | | |
|---|---|---|---|---|
| 2010/0070758 A1* | 3/2010 | Low | ................ | H04L 63/08 |
| | | | | 709/204 |
| 2013/0291001 A1* | 10/2013 | Besehanic | ........ | H04N 21/25891 |
| | | | | 725/20 |
| 2014/0325551 A1* | 10/2014 | McMillan | ........ | H04N 21/25841 |
| | | | | 725/20 |
| 2015/0281746 A1* | 10/2015 | Lam | ................ | H04N 21/23605 |
| | | | | 725/116 |

* cited by examiner

METHODS AND APPARATUS TO MONITOR DIGITAL MEDIA

RELATED APPLICATION

This patent arises from a continuation of U.S. patent application Ser. No. 17/947,997 (Now U.S. Pat. No. 11,838,584), which was filed on Sep. 19, 2022, which is a continuation of U.S. patent application Ser. No. 17/135,983 (Now U.S. Pat. No. 11,451,867), which was filed on Dec. 28, 2020, which is a continuation of U.S. patent application Ser. No. 16/234,528 (Now U.S. Pat. No. 10,880,600), which was filed on Dec. 27, 2018. U.S. patent application Ser. No. 16/234,528, U.S. patent application Ser. No. 17/135,983 and U.S. patent application Ser. No. 17/947,997 are hereby incorporated herein by reference in their entireties. Priority to U.S. patent application Ser. No. 16/234,528, U.S. patent application Ser. No. 17/135,983 and U.S. patent application Ser. No. 17/947,997 are hereby claimed.

FIELD OF THE DISCLOSURE

This disclosure relates generally to media monitoring and, more particularly, to methods and apparatus to monitor digital media.

BACKGROUND

Media players on electronic devices (e.g., smartphones, tablet computers, computers, smart televisions, set top boxes, etc.) enable access to a wide range of digital media (e.g., streamed media or media on-demand). The media can be streamed from the Internet via a browser or an application dedicated for streaming media or playing media. Additionally or alternatively, a media provider (e.g., CBS, HBO, NBC, etc.) may provide media on-demand to allow a user to watch movies, television programs, etc., as part of their subscription to the media provider. Many media streaming websites, media streaming applications, or media on-demand include and/or are required to provide advertisements along with content selected for presentation by a viewer or machine (e.g., web crawler).

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
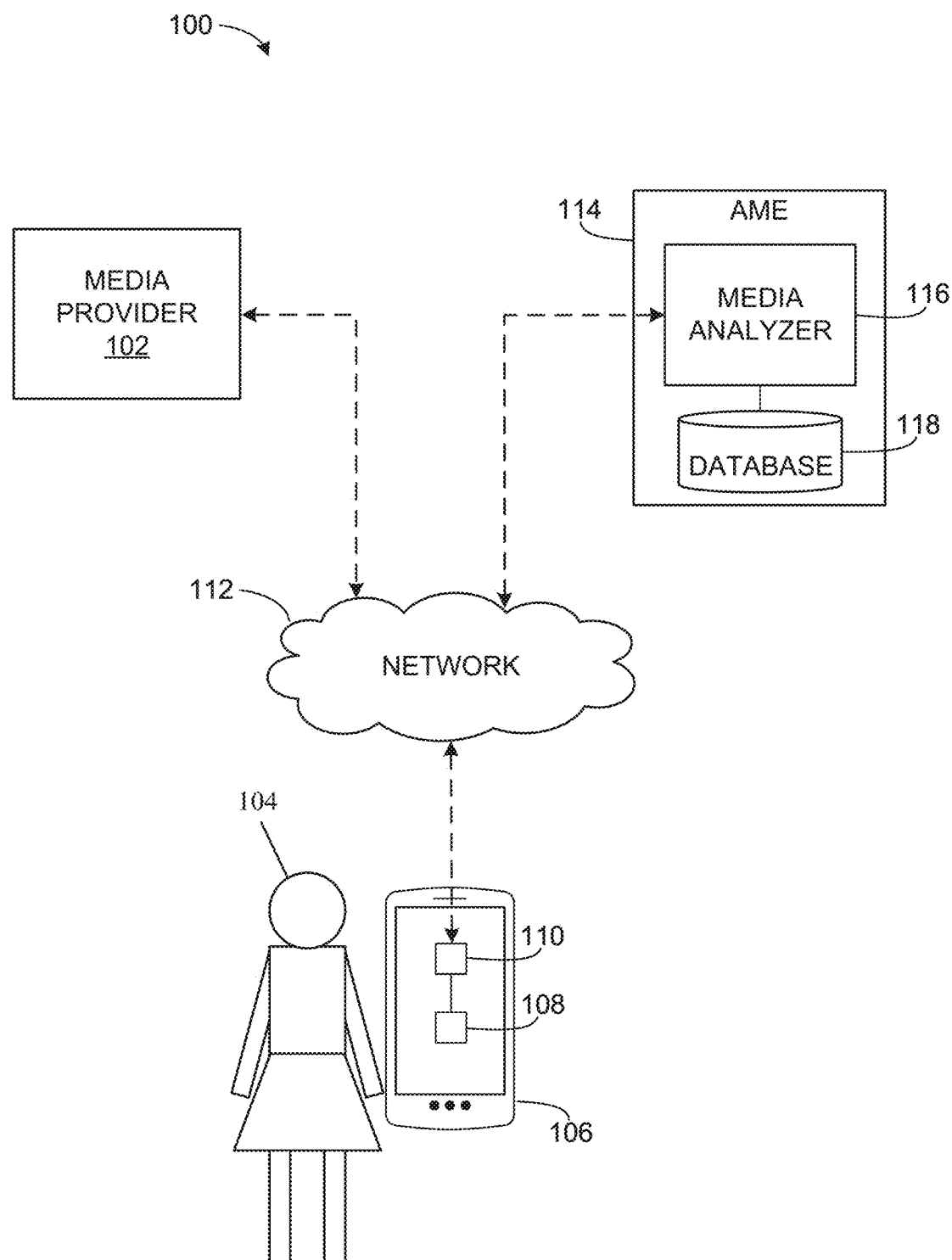
FIG. 1 illustrates an example environment for monitoring media in conjunction with teachings of this disclosure.

Consuming media presentations generally involves listening to audio information and/or viewing video information such as, for example, radio programs, music, television programs, movies, still images, etc. Media-centric companies such as, for example, advertising companies, broadcast networks, etc. are often interested in verifying that a media provider is outputting advertisements according to an agreement between the media centric companies and the media providers. A technique that may be used to measure the exposure to media involves awarding media exposure credit to a media presentation for each audience member that is exposed to the media presentation.

Media exposure credit is often measured by monitoring the media consumption of audience members using, for example, metering devices. A meter may be an electronic device and/or may be software implemented in an electronic device configured to monitor media consumption (e.g., viewing and/or listening activities) using any of a variety of media monitoring techniques. For example, when a media provider (e.g., CBS, HBO, NBC, etc.) enters into an agreement with an audience measurement entity (AME) (e.g., The Nielsen Company (U.S.), LLC), the media provider may agree to insert ancillary codes (e.g., watermarks) and/or ID3 tags into the media prior to distribution of the media to media output devices (e.g., smartphones, set-top-boxes (STBs), computers, smart televisions, and/or any other client device that is capable of outputting media). The meter may be installed on a media output device of the user or panelist. The meter searches for the watermarks and/or ID3 tags and transmits the obtained watermarks and/or ID3 tags to the AME. Panelists are persons that have agreed to be monitored by, for example, an audience measurement entity (AME) such as The Nielsen Company (U.S.), LLC. Typically, such panelists provide detailed demographic information (e.g., race, age, income, home location, education level, gender, etc.) when they register to participate in the panel and agree to have the meter installed on one or more media output device.

In examples illustrated below, media exposure metrics are monitored by retrieving metadata embedded in or otherwise transported with the media presented via a media presenter of the client device (e.g., based on the agreement between the media provider and the AME). In some examples, the metadata is stored in a Document Object Model (DOM) object. In some examples, the metadata is stored in an ID3 tag format, although any other past, present, and/or future metadata format may additionally or alternatively used. The DOM is a cross-platform and language-independent convention for representing and interacting with objects in Hypertext Markup Language (HTML).

In some examples, media presenters (e.g., media plugins) such as, for example, the QuickTime player, emit DOM events that can be captured via JavaScript. By capturing the DOM events triggered by the media presenter, it is possible to extract the metadata (e.g., the ID3 tag data) via the DOM. The metadata may be combined with other information such as, for example, cookie data associated with the user of the device, and transmitted to, for example, a central facility for analysis and/or computation with data collected from other devices. The collection of ID3 tags from a plurality of media output devices corresponding to digital media (e.g., streaming media, media on demand, etc.) is herein referred to as census data.

Example methods, apparatus, systems, and articles of manufacture disclosed herein involve collecting census data to extract metadata (e.g., metadata stored in an ID3 tag, extensible markup language (XML) based metadata, and/or metadata in any other past, present, and/or future format) associated with digital media transmissions (e.g., streaming audio, streaming video, video on-demand, and/or audio on demand) at a client device to perform validation procedure(s). Validation procedure(s) may include determining that a media provider is inserting advertisements in digital media according to an agreement (e.g., the media provider is outputting the agreed upon agreements at the agreed upon times, the media provider is not inserting additional advertisements in the media, the media provider is not dynamically inserting ads during national commercials, etc.) and/or identifying transcoder outages.

In some examples, a media provider may provide the same advertisements for online media as it does for the broadcast media. In such examples, the AME can credit online media in a particular category based on the advertisements in the broadcast media. Part of an agreement between a media provider and an AME may correspond to specific durations of time. For example, an agreement between an AME and a media provider may require that the media provider play advertisements during predefined commercial pods (e.g., duration of time dedicated only for advertisements). However, when ID3 tags are collected by meter, the timing information stored in the ID3 tag and/or the metadata of the ID3 tag may be inaccurate when the timer used by the meter and/or the device implementing the meter may be inaccurate. For example, if the timer is 10 seconds slow, the census data corresponding to the timer will be 10 seconds off, thereby affecting the validation of the agreement. Accordingly, examples disclosed herein determine and apply an offset to the census data to align the census data with linear reference data. Once aligned, the offset census data can be accurately processed for validation.

Additionally, examples disclosed herein reduce the amount of resources needed to perform validation based on census data by first extracting raw ID3 tags from the census data, as opposed to decrypting the entire ID3 tag. Extracting raw ID3 tags consumes less resources than decrypting ID3 tags. Once the raw ID3 tag is extracted, examples disclosed herein identify and discard duplicate ID3 tags prior to decryption. In this manner, the number of ID3 tags to decrypt is much less than the total number of ID3 tags including duplicates, thereby consuming less resources than processing all ID3 tags of obtained census data. Using examples disclosed herein, census data may be used in a validation process in minutes instead of hours.

FIG. 1 illustrates an example environment 100 for monitoring digital media in conjunction with teachings of this disclosure. The example environment 100 includes an example media provider 102, an example user 104, an example media device 106, an example AME application 108, an example wireless interface 110, an example network 112, an example AME 114, an example media analyzer 116, and an example database 118.

The media provider 102 of the illustrated example of FIG. 1 corresponds to any one or more media provider(s) capable of providing media for presentation via the media device 106. The media provided by the media provider 102 can provide any type(s) of media, such as audio, video, multimedia, etc. Additionally, the media can correspond to live media, streaming media, broadcast media, stored media, on-demand content, etc. In some examples, the media provider 102 of the illustrated example of FIG. 1 is a server providing Internet media (e.g., web pages, audio, videos, images, etc.). The media provider 102 may be implemented by a broadcast provider (cable television service, fiber-optic television service, etc.) and/or a digital media provider (e.g., Internet streaming/on-demand video such as Netflix®, YouTube®, Hulu®, HBO GO, etc. and/or audio services such as Spotify®, Shoutcast®, Stitcher®, Pandora®, Last.Fm®, etc.) and/or any other provider of streaming media services and/or media on-demand services. In some other examples, the media provider 102 is a host for web site(s). Additionally or alternatively, the media provider(s) 102 may not be on the Internet. For example, the media provider may be on a private and/or semi-private network (e.g., a LAN, a virtual private network) to which the media device 106 connects via the example network 112. The media provider 102 may include a transcoder to extract AME watermarks and generate an ID3 tag including a plurality of AME watermarks. For example, the AME 114 may insert a watermark into audio streams included in media (e.g., which may or may not be timestamped). The transcoder of the media provider 102 receives the audio stream, reads, decodes, and interprets the encoded audio to extract and analyze the AME watermarks (e.g., to determine watermark types). Once analyzed, the transcoder generates an ID3 tag with a plurality of watermarks. Before transmitting the ID3 tag, the transcoder timestamps the start time (e.g., relative or absolute), when the transcoder began to process the audio for the ID3 tag and the end time (e.g., relative or absolute), when the transcoder stopped processing the audio for the ID3 tag. Additionally, the example transcoder adds an offset value for each watermark. The offset value corresponds to the amount of time after the start time that the transcoder detected the watermark. Once timestamped, the transcoder inserts the ID3 tag into media (e.g., a MPEG stream segment) and transmits the media to the example media device 106 via the network 112.

The user 104 of FIG. 1 may be a person that has agreed to be monitored by the AME 114 (e.g., a panelist). When the user 104 agrees to be part of a panel, the user 104 is required to install and/or have installed the example AME application 108 on the media device 106 to be able to transmit census data gathered on the media device 106 to the AME 114 via the media device 106, as further described below. In other examples, the user 104 is not a panelist. In such examples, the AME 114 may have an agreement with the media provider 102, where the media provider 102 allows the AME 114 to install a software development kit (SDK) to monitor the media displayed on the media device 106 (e.g., the SDK implementing the example AME application 108) and transmit obtained ID tags to the AME 114. In such examples, the SDK and/or media provider software may anonymize the data to protect the identity of the user 104.

The media device 106 of FIG. 1 is a device that retrieves media from the media provider 102 for presentation or output. In some examples, the media device 106 is capable of directly presenting media (e.g., via a display or internal speakers) and/or indirectly presenting media (e.g., via a connected display and/or connected speakers). For example, the media device 106 of the illustrated example is a mobile phone (e.g., smart phone). Alternatively, the media device 106 may be a gaming console (e.g., Xbox®, Playstation® 3, etc.), a streaming media device (e.g., a Google Chromecast, an Apple TV) a smart media device (e.g., an iPad, a tablet, etc.), digital media players (e.g., a Roku® media player, a Slingbox®, etc.), a smart television, a STB, a computing device, etc. The example media device 106 may utilize an application to access media from the media provider 102 via the network 112. For example, the media device 106 may use a media provider application to stream media and/or output media on-demand provided by the media provider 102. As further described below, the media device 106 of the user 104 includes the AME application 108 and the wireless interface 110.

The AME application 108 of FIG. 1 is a meter that obtains the census data (e.g., ID3 tags) based on digital media from the media provider 102 accessed by the example media device 106. For example, when the example media device 106 obtains media (e.g., including the ID3 tags) from the example media provider 102 to be output by the media device 106, the AME application 108 gathers the received ID3 tags and transmits the ID3 tags to the AME 114 using the example wireless interface 110. In some examples, the AME application 108 is an application that may be installed by a panelist. In some examples, the AME application 108 is an SDK that is included with a media provider application based on an agreement between the media provider 102 and the AME 114.

The example wireless interface 110 of FIG. 1 transmits and receives data via wireless communications (e.g., a cellular communication, a Wi-Fi communication, etc.) using the example network 112. For example, the wireless interface 110 may receive media from the example media provider 102 to be presented/output by the media device 106 and/or an external component connected (e.g., via a wired or wireless connection) to the media device 106. Additionally, the wireless interface 110 may transmit census data (e.g., obtained ID3 tags corresponding to digital media accessed by the media device 106) to the example AME 114 via the network 112.

The example network 112 of the illustrated example of FIG. 1 is a network like the Internet, a wireless mobile telecommunications network (e.g., 2G, 3G, LTE, etc.), and/or a cellular network. However, the example network 112 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 112 enables the media provider 102, the media device 106, and the AME 114 to communicate data (e.g., media, media monitoring data, SDK census data, etc.) between each other.

The example AME 114 of FIG. 1 is a central facility that may be implemented by a server that collects and processes census data including ID3 tags from the media device 106 and other media devices in a region, location, and/or universe to monitor distribution of digital media provided by the media provider 102 via the example network 112. The AME 114 analyzes the census information to determine whether there is a transcoder outage, whether identified clients are dynamically inserting advertisement during national commercials, etc., for example. The census information may also be correlated or processed with factors such as geodemographic data (e.g., a geographic location of the media exposure measurement location, age(s) of the panelist(s) associated with the media exposure measurement location, an income level of a panelist, etc.) Census information may be useful to manufacturers and/or advertisers to validate agreement/contract terms with a media provider, identify transcoder outages, determine which features should be improved, determine which features are popular among users, identify geodemographic trends with respect to media presentation devices, identify market opportunities, and/or otherwise evaluate their own and/or their competitors' products. The example AME 114 includes the example media analyzer 116 and the example database 118, as further described below.

The example media analyzer 116 of FIG. 1 processes received census data to obtain ID3 tags and decrypt the filtered ID3 tags to be able to validate agreements with the media provider 102. Because the clock/timer used to timestamp the ID3 tags may be off (e.g., fast or slow), the example media analyzer 116 performs an alignment process to offset the inaccurate timestamps. Additionally, to reduce processor resources, the media analyzer 116 filters out duplicate ID3 tags prior to decrypting the ID3 tags. An example implementation of the example media analyzer 116 is further described below in conjunction with FIG. 2.

In the illustrated example of FIG. 1, the AME 114 includes the example database 118 to store ID3 information and/or validation information. The database 118 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 118 may additionally or alternatively be implemented by one or more double data rate (DDR) memories, such as DDR, DDR2, DDR3, DDR4, mobile DDR (mDDR), etc. The database 118 may additionally or alternatively be implemented by one or more mass storage devices such as hard disk drive(s), compact disk drive(s), digital versatile disk drive(s), solid-state disk drive(s), etc. While in the illustrated example of FIG. 1 the database 118 is illustrated as a single database, the database 118 may be implemented by any number and/or type(s) of databases. Furthermore, the data stored in the database 118 may be in any data format such as, for example, binary data, comma delimited data, tab delimited data, structured query language (SQL) structures, etc.

Figure 2:
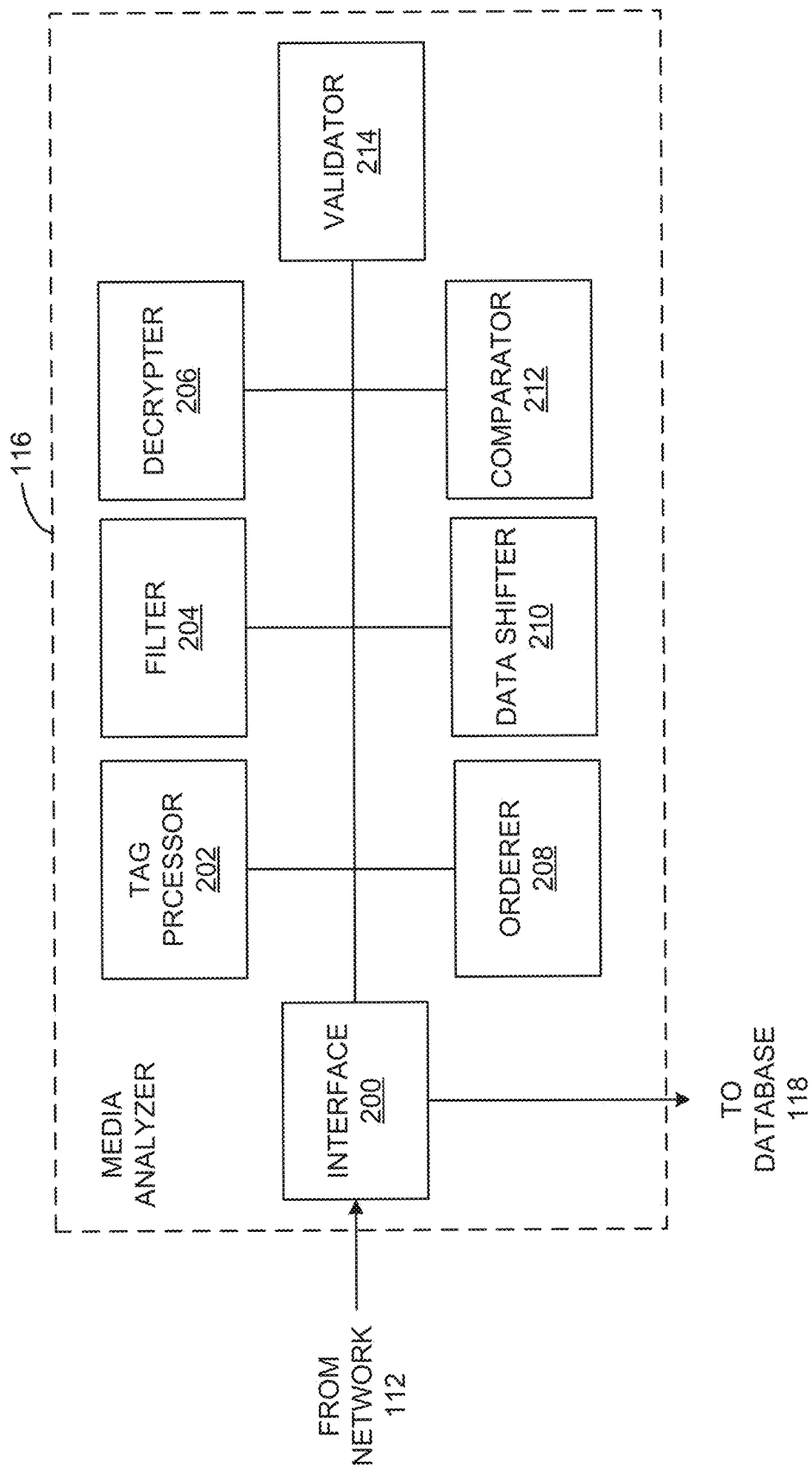
FIG. 2 is a block diagram of an example implementation of the media analyzer of FIG. 1.

FIG. 2 is a block diagram of an example implementation of the media analyzer 116 of FIG. 1. The example media analyzer 116 of FIG. 2 includes an example interface 200, an example tag processor 202, an example filter 204, an example decrypter 206, an example orderer 208, an example data shifter 210, an example comparator 212, and an example validator 214.

The example interface 200 of FIG. 2 receives data (e.g., census data) from the example media device 106 and other media devices via the network 112 of FIG. 1. The census data may correspond to a particular location and/or duration of time or may be pre-filtered by the AME 114 to separate the census data into predefined regions and/or predefined durations of time. Additionally, the interface 200 may transmit the census data and/or validation data to the example database 118 to be stored. In some examples, the interface 200 may transmit an alert when, for example, the example validator 214 flags the census data (e.g., because it does not follow an agreement). In such examples, the interface 200 may transmit the alert to an administrator, a client, and/or another processor of the AME 114. The alert may include a report that corresponds to the validation process.

The example tag processor 202 of FIG. 2 processes ID3 tags of the census data. For example, the tag processor 202 extracts raw ID3 tags from the census data. The raw census data packet may include ID3 data tags, Info Tags, IPs, Device identifiers, software developer kit (SDK) versions (e.g., corresponding to the version of the AME application 108), device type information, etc. To save resources, the tag processor 202 extracts only the ID3 data tag from the census data. As further described below, the example filter 204 filters out duplicate census data based on the extracted ID3 data tag to reduce the amount of ID3 decryption that will occur (e.g., which corresponds to the most resources to compute). Additionally, the tag processor 202 may process the ID3 tag information and/or the metadata of the ID3 tags (e.g., after decryption) to assist the filter 204, as further described below.

The example filter 204 of FIG. 2 filters out ID3 tags that appear less than a threshold number of times in the census data. ID3 tags that appear less than a threshold number of times likely correspond to ID3 extraction errors and/or ID3 generation errors. Accordingly, the example filter 204 filters out such ID3 tags to remove potential errors in the census data. The threshold number may be set to one and/or any other number based on user, client, and/or manufacturer preferences. Additionally, the example filter 204 may filter metadata stored in an ID3 tag once the remaining ID3 tags are decrypted to obtain the metadata. For example, the tag processor 202 may identify media providers (e.g., corresponding to stations, channels, etc.) corresponding to the obtained ID3 tags based on the metadata of the ID3 tag. In such an example, the filter 204 may filter the ID3 tags and/or corresponding metadata based on the identified stations, channels, etc. using the content identifier (CID) of the ID3 tags. Additionally, the example filter 204 may filter out duplicate ID3 tags. For example, when two or more AME applications of two or more media devices access the same media, the two or more media devices transmit the same corresponding ID3 tags to the AME 114. Accordingly, there may be multiple (e.g., hundreds, thousands, etc.) duplicate ID3 tags obtained by the AME 114. Accordingly, before the decrypter 206 decrypts the ID3 tags, the example filter 204 filters out duplicate ID3 tags based on the raw ID3 tag information, thereby reducing the number of ID3 tags that need to be decrypted without losing any information. In some examples, the filter 204 is multiple filters to perform the multiple filtering processes.

The example decrypter 206 of FIG. 2 decrypts the ID3 tags to identify the metadata stored therein. Because the decryption process is resource intensive, the example decrypter 206 decrypts the deduplicated ID3 tags (e.g., duplicates filtered out by the example filter 204), thereby conserving processor resources. The metadata included in the ID3 tags may include information corresponding to ancillary codes (e.g., watermarks), timestamp information, CID information, offset information, etc. Accordingly, decrypting the ID3 tag allows the media analyzer 116 to process the metadata for validation.

The example orderer 208 of FIG. 2 orders the metadata information according to a start time encoded in the ID3 tag. As described above, a transcoder 102 of the media provider 102 transcodes AME watermarks in audio by extracting the AME watermarks and bundling the AME watermarks into an ID3 tag. The transcoder includes a start time corresponding to when the transcoding began to process the audio for the ID3 tag, an end time corresponding to when the transcoder stopped processing the audio for the ID3 tag, and watermark offset times corresponding to when the transcoder detected each watermark (e.g., the amount of time after the start time). To determine the transcoding time of a code/watermark, the example tag processor 202 may identify the first timestamp of the ID3 tag and add the code/watermark offset, as described above in conjunction with FIG. 1. Alternatively, the tag processor 202 may determine the transcoding time of a code/watermark based on a timestamp of the code/watermark itself. However, not all codes/watermarks may be timestamped, but all codes/watermarks will include an offset. Once the tag processor 202 identifies/determines the transcoding time of the codes/watermarks, the example orderer 208 orders the codes/watermarks (e.g., metadata) based on the transcoding time (e.g., by performing a simple sort).

Once the codes/watermarks are stored based on transcoding time and filtered by station, the example data shifter 210 and the example comparator 212 of FIG. 2 align the station-based ordered metadata (e.g., code/watermark data) with a station-based media monitoring system (MMS) linear reference data representative of accurate broadcast data. As described above, the timer/clock used by the example AME application 108 may be inaccurate (e.g., slow or fast by X number of seconds, minutes, etc.). However, clocks/timers used by almost all modern electronic devices are precise (e.g., regardless of how fast or slow the clock/timer is, the clock/timer's measurement of a second is precise). Additionally, the example AME 114 may require that the clock used by the AME application 108 be precise, but not necessarily accurate. Because the amount of time that the clock/timer is off by is unknown, the example data shifter 210 applies different offsets to the timing information of the watermarked data to more closely align with linear reference data. For example, the example comparator 212 determines an error corresponding to a difference between code events of the station-based ordered metadata and event codes of the station-based linear reference data. For example, the comparator 212 may compare commercial codes (CCs) of the ordered metadata to CCs of the station-based linear reference data to determine an error (e.g., an amount of differentiation or average difference based on time). The smaller the error, the closer the offset ordered metadata matches the linear reference data. The example data shifter 210 applies the offset corresponding to the smallest error to the station-based to the station-based metadata.

The example validator 214 of FIG. 2 validates information (e.g., an agreement, a contract, etc.) based on the adjusted/aligned station-based metadata. For example, the agreement may include start and end times of commercial pods during a duration of time for a specific channel. Accordingly, the example validator 214 compares the CCs of the adjusted/aligned ordered metadata corresponding to the station to the commercial pod duration to determine how many of the CCs are within or outside of the designed commercial pods (e.g., potentially corresponding to additional advertisements that may have been inserted into media). Additionally or alternatively, the example validator 214 may determine if CCs are absent from the commercial pods (e.g., potentially corresponding to transcoder errors). In some examples the validator 214 flags data based on some criteria (e.g., more than a threshold number or percentage of CC codes outside of a commercial pod within a predefined duration of time) and instructs the interface 200 to transmit a warning corresponding to the flag.

While an example manner of implementing the example media analyzer 116 of FIG. 1 is illustrated in FIG. 2, one or more of the elements, processes and/or devices illustrated in FIG. 2 may be combined, divided, re-arranged, omitted, eliminated and/or implemented in any other way. Further, the example interface 200, the example tag processor 202, the example filter 204, the example decrypter 206, the example orderer 208, the example data shifter 210, the example comparator 212, the example validator 214, and/or, more generally the media analyzer 116 of FIG. 2 may be implemented by hardware, software, firmware and/or any combination of hardware, software and/or firmware. Thus, for example, any of the example interface 200, the example tag processor 202, the example filter 204, the example decrypter 206, the example orderer 208, the example data shifter 210, the example comparator 212, the example validator 214, and/or, more generally the media analyzer 116 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example tag processor 202, the example filter 204, the example decrypter 206, the example orderer 208, the example data shifter 210, the example comparator 212, the example validator 214, and/or, more generally the media analyzer 116 of FIG. 2 is and/or are hereby expressly defined to include a non-transitory computer readable storage device or storage disk such as a memory, a digital versatile disk (DVD), a compact disk (CD), a Blu-ray disk, etc. including the software and/or firmware. Further still, the example media analyzer 116 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
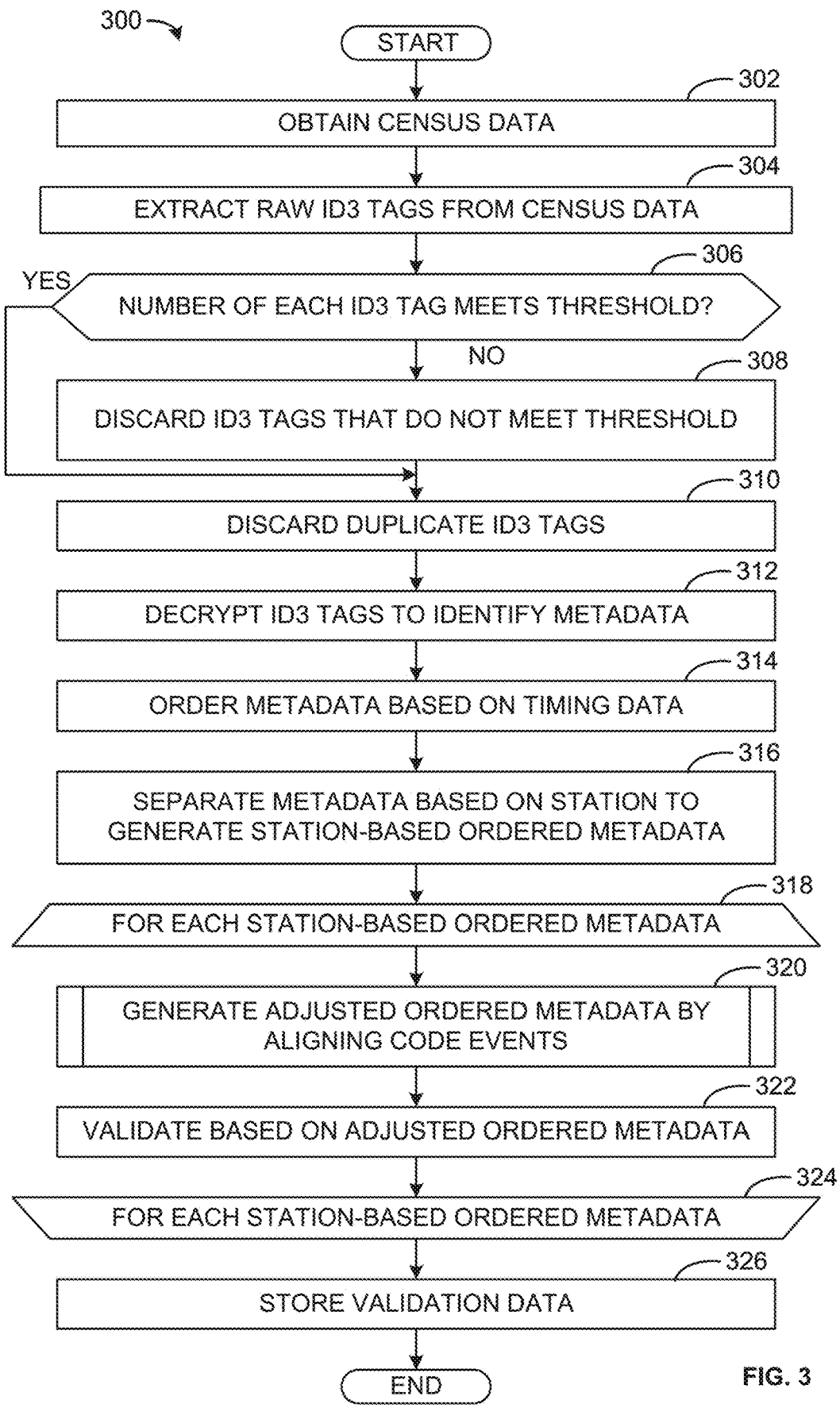
FIGS. 3 and 4 are flowcharts representative of example machine readable instructions which may be executed to implement the example media analyzer of FIGS. 1 and/or 2.
Figure 4:
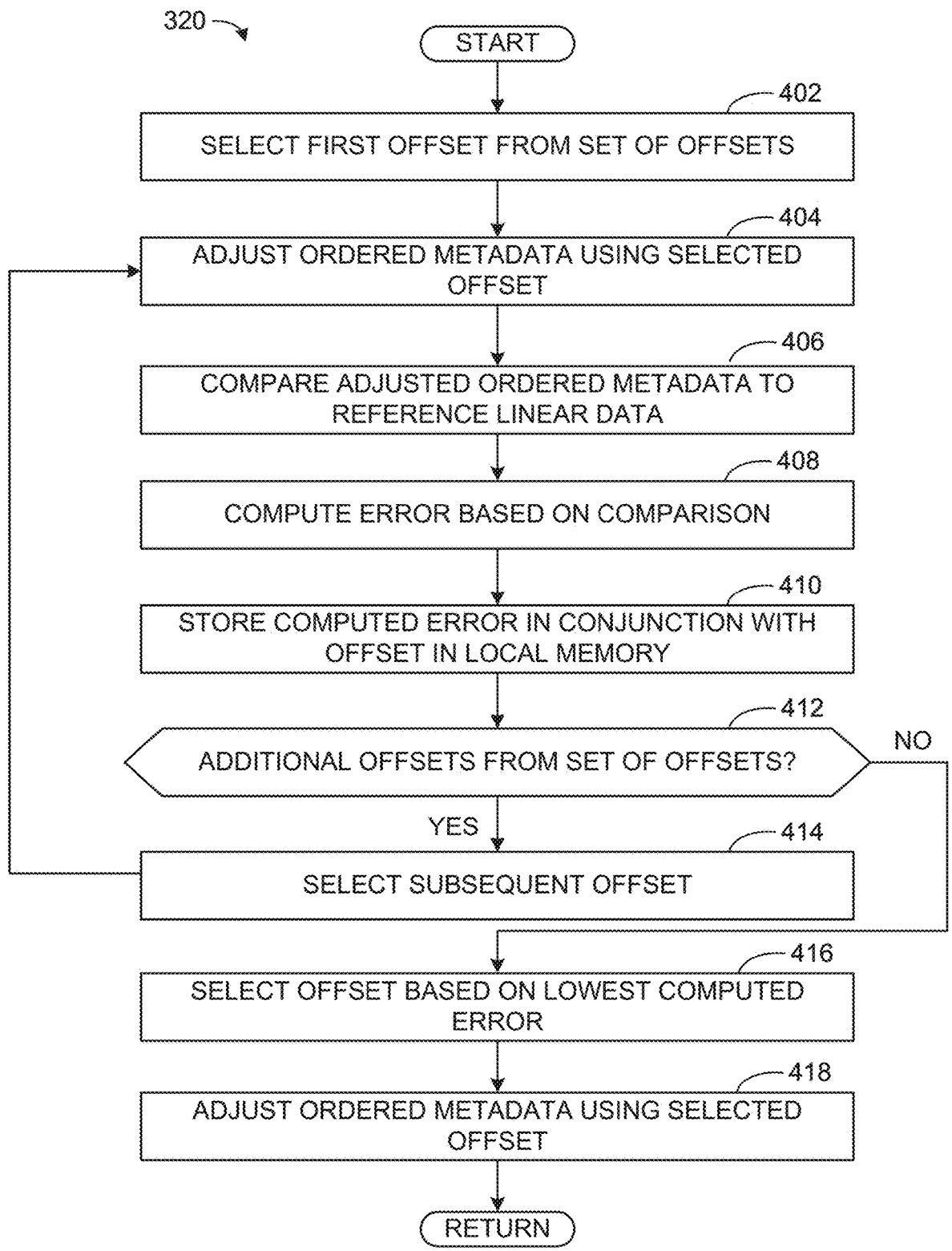

Flowcharts representative of example hardware logic, machine readable instructions, hardware implemented state machines, and/or any combination thereof for implementing the example media analyzer 116 of FIG. 2 are shown in FIGS. 3-4. The machine readable instructions may be an executable program or portion of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3-4, many other methods of implementing the example media analyzer 116 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 3 is an example flowchart 300 representative of example machine readable instructions that may be executed by the example media analyzer 116 of FIGS. 1 and/or 2 to monitor and/or validate digital media. Although the flowchart 300 of FIG. 3 is described in conjunction with media analyzer 116 of FIGS. 1 and/or 2, other type(s) of media analyzer(s), and/or other type(s) of processor(s) may be utilized instead.

At block 302, the example interface 200 obtains census data from the example client device 106 and other client devices of other panelists. As described above, the census data includes ID3 tags corresponding to media transmitted to and displayed by the example client device 106. Each ID3 tag may include metadata corresponding to watermarks of the media. At block 304, the example tag processor 202 extracts raw ID3 tag from census data. Duplicate ID3 tags will be the same. Thus, the example media analyzer 116 can identify duplicate ID3 tags from the extracted raw ID3 tags prior to decryption.

At block 306, the example tag processor 202 determines if the number of each unique ID3 tag meets a threshold. As described above in, when an ID3 is inserted into media, the census data will likely include hundreds or more of the ID3 tags from the multiple meters in the universe. Accordingly, if less than a threshold number of a specific ID3 tag is included in the census data (e.g., 1 or 2), then it is probable that the ID3 tag is an error (e.g., and can be discarded). If the example tag processor 202 determines that a total number of one or more ID3 tags does not the (block 306: NO), the example filter 204 discards (e.g., filters out) the ID3 tags that do not meet the threshold (block 308).

At block 310, the example filter 204 discards (e.g., by filtering out) duplicate ID3 tags. Because there are likely to be hundreds or more duplicate ID3 tags, decrypting the hundreds of duplicate ID3 tags requires lots of processor resources without providing any additional data. Accordingly, the example filter 204 discards the duplicate ID3 tags to conserve processor resources. At block 312, the example decrypter 206 decrypts the remaining ID3 tags to identify the stored metadata (e.g., corresponding to watermarks). At block 314, the example orderer 208 orders the metadata based on timing data of the metadata. For example, the tag processor 202 may determine the transcoding time of the individual watermarks of the ID3 tags by adding the offset of the individual codes/watermarks to the start time of the ID3 tag. Once the tag processor 202 determines the transcoding time of the codes/watermarks in the metadata, the example orderer 208 orders the codes/watermarks based on the transcoding time of the codes/watermarks.

At block 316, the example filter 204 separates the metadata according to station to generate station-based ordered metadata. For example, the tag processor 202 may identify the station identifier (SID) of the individual codes/watermarks and the example filter 204 may separate the codes/watermarks according to the SIDs. For each station-based ordered metadata (blocks 318-324), the example media analyzer 116 generates an adjusted ordered metadata by aligning code events of the ordered metadata (block 320). At block 322, the example validator 214 validates criteria based on the adjusted/aligned ordered metadata. For example, as described above in conjunction with FIG. 2, the validator 214 may identify whether an agreement between the media provider 102 and the AME 114 is satisfied by determining whether CC codes of the adjusted ordered metadata fall within predetermined commercial pods by comparing the adjusted ordered metadata with the predefined commercial pod information. At block 326, the example interface 200 stores the example validation data/results in the example database 118 of FIG. 1. In some examples, the interface 200 may also transmit an alert to a user, customer, client, and/or system administrator in response to a validation. The alert may include a report corresponding to the validation process.

FIG. 4 is an example flowchart 320 representative of example machine readable instructions that may be executed by the example media analyzer 116 of FIGS. 1 and/or 2 to generate adjusted ordered metadata by aligning code events, as described above in conjunction with block 320 of FIG. 3. Although the flowchart 320 of FIG. 4 is described in conjunction with media analyzer 116 of FIGS. 1 and/or 2, other type(s) of media analyzer(s), and/or other type(s) of processor(s) may be utilized instead.

At block 402, the example data shifter 210 selects a first offset from a set of offsets. The number and/or interval of the offsets may be based on an amount of alignment accuracy that is desired by a user and/or client. For example, the offsets may correspond to any number of second intervals, minute intervals, millisecond intervals, etc. At block 404, the example data shifter 210 adjusts (e.g., shifts) the ordered metadata using the selected offset. For example, if the offset is +1 second, the example data shifter 210 shifts each ordered watermark/codes in the ordered metadata by +1 second.

At block 406, the example comparator 212 compares the adjusted ordered metadata to reference linear data. For example, the comparator 212 may compare the CC codes of the example adjusted ordered metadata to the CCs of the reference linear data to see if the transducing times of the CCs of the adjusted ordered metadata match the timestamps of the CCs of the referenced linear data. At block 408, the example comparator 212 computes an error based on the comparison. For example, the comparator 212 may determine a difference (e.g., an average difference) between transcoding times of CCs of the adjusted ordered metadata to the transcoding times of CCs of the reference linear data. At block 410, the example comparator 212 stores the computed error in conjunction with the selected offset in local memory (e.g., the example local memory 513 of FIG. 5). At block 412, the example data shifter 210 determines if there are additional offsets from the set of offsets.

If the example data shifter 210 determines that there are additional offsets from the set of offsets (block 412: YES), the data shifter 210 selects a subsequent offset from the set of offsets (block 414), and the process returns to block 404. If the example data shifter 210 determines that there are no additional offsets from the set of offsets (block 412: NO), the example data shifter 210 selects the offset corresponding to the lowest computed error from the local memory (e.g., the example local memory 513) (block 416). At block 418, the example data shifter 210 adjusts the ordered metadata using the selected offset to generate the adjusted ordered metadata. For example, if the offset is +1 second, the example data shifter 210 shifts each ordered code/watermark in the ordered metadata by +1 second.

Figure 5:
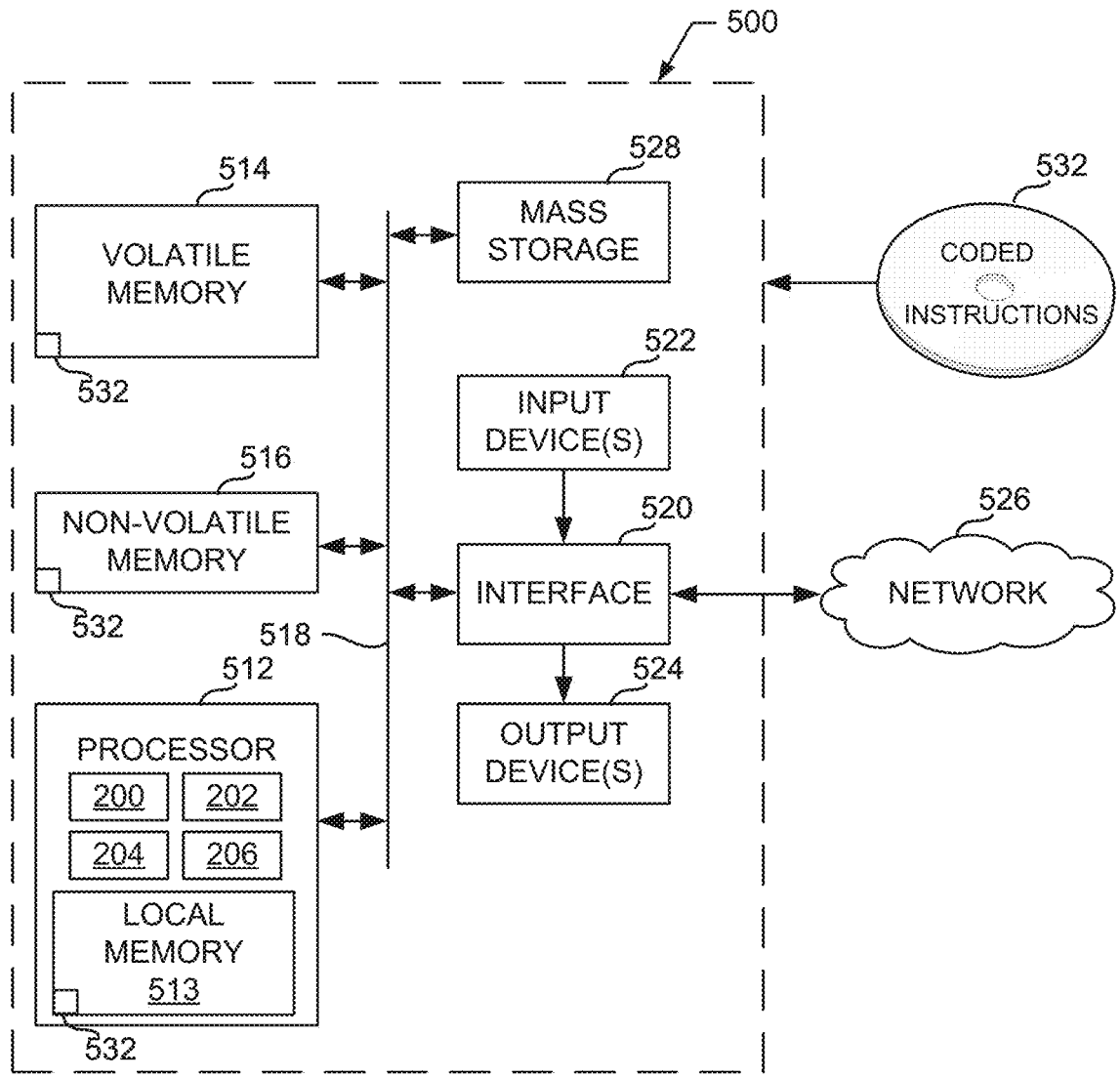
FIG. 5 is a block diagram of an example processor platform structured to execute the instructions of FIGS. 3 and/or 4 to implement the example media analyzer of FIGS. 1 and/or 2.

FIG. 5 is a block diagram of an example processor platform 500 structured to execute the instructions of FIG. 3-4 to implement the example media analyzer 116 of FIG. 2. The processor platform 500 can be, for example, a server, a personal computer, a workstation, a self-learning machine (e.g., a neural network), a mobile device (e.g., a cell phone, a smart phone, a tablet such as an iPad™), or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 512 implements the example interface 200, the example tag processor 202, the example filter 204, the example decrypter 206, the example orderer 208, the example data shifter 210, the example comparator 212, and the example validator 214 of FIG. 2.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3-4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been to monitor digital media. The disclosed methods, apparatus and articles of manufacture fix the technical problem of obtaining ID3 tags including inaccurate timing information from inaccurate clocks by aligning codes of obtained metadata with reference data to provide more accurate validation processes. Additionally, examples disclosed herein reduce the amount of processor resources needed to process ID3 tags to perform validation processes by deduplicating ID3 tags prior to decrypting the ID3 tags. Disclosed methods, apparatus and articles of manufacture are accordingly directed to one or more technical improvement(s) to a processor used to monitor and process ID3 tags.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system, comprising:
   a network interface;
   a processor; and
   memory storing computer-readable instructions that, when executed by the processor, cause the computing system to perform operations comprising:
      obtaining, via the network interface, census data comprising metadata corresponding to media presented by client devices;
      for each time offset of a plurality of time offsets;
         adjusting timing information of the metadata by the time offset, and determining an error based on a comparison of the adjusted timing information of the metadata to reference data;
      based on a plurality of errors determined for the plurality of time offsets, selecting one of the plurality of time offsets; and
      adjusting the timing information of the metadata using the selected time offset.

2. The computing system of claim 1, wherein the metadata is stored in ID3 tags included in the census data.

3. The computing system of claim 2, the operations further comprising:
   extracting the ID3 tags from the census data; and
   decrypting the ID3 tags to obtain the metadata.

4. The computing system of claim 2, the operations further comprising:
   identifying, from the ID3 tags, duplicate ID3 tags; and
   discarding the duplicate ID3 tags.

5. The computing system of claim 1, wherein the metadata of the census data has inaccurate timing information, and
   wherein the reference data is representative of broadcast data having accurate timing information.

6. The computing system of claim 1, wherein obtaining the census data comprises obtaining the census data from the client devices, and
   wherein the client devices are client devices of panelists of an audience measurement entity.

7. The computing system of claim 1, wherein selecting the time offset from the time offsets based on the plurality of errors comprises selecting a the selected time offset corresponds to the lowest error of the plurality of errors determined for the plurality of time offsets.

8. The computing system of claim 1, wherein the timing information of the metadata comprises transcoded timestamps characterizing a starting time of media processing and an ending time of media processing to generate the metadata.

9. A non-transitory computer readable medium comprising instructions that, when executed, cause a processor to perform operations comprising:
   obtaining, via a network interface, census data comprising metadata corresponding to media presented by client devices;
      for each time offset of a plurality of time offsets;
         adjusting timing information of the metadata by the time offset, and determining an error based on a comparison of the adjusted timing information of the metadata to reference data;
      based on a plurality of errors determined for the plurality of time offsets, selecting one of the plurality of time offsets; and
      adjusting the timing information of the metadata using the selected time offset.

10. The non-transitory computer readable medium of claim 9, wherein the metadata is stored in ID3 tags included in the census data.

11. The non-transitory computer readable medium of claim 10, the operations further comprising:
    extracting the ID3 tags from the census data; and
    decrypting the ID3 tags to obtain the metadata.

12. The non-transitory computer readable medium of claim 10, the operations further comprising:
    identifying, from the ID3 tags, duplicate ID3 tags; and
    discarding the duplicate ID3 tags.

13. The non-transitory computer readable medium of claim 9, wherein the metadata of the census data has inaccurate timing information, and
    wherein the reference data is representative of broadcast data having accurate timing information.

14. The non-transitory computer readable medium of claim 9, wherein obtaining the census data comprises obtaining the census data from the client devices, and
    wherein the client devices are client devices of panelists of an audience measurement entity.

15. The non-transitory computer readable medium of claim 9, wherein the selected time offset corresponds to the lowest error of the plurality of errors determined for the plurality of time offsets.

16. A method performed by a computing system comprising a processor and a network interface, the method comprising:
    obtaining, via the network interface, census data comprising metadata corresponding to media presented by client devices;

for each time offset of a plurality of time offsets;
adjusting timing information of the metadata by the time offset, and determining an error based on a comparison of the adjusted timing information of the metadata to reference data;
based on a plurality of errors determined for the plurality of time offsets, selecting one of the plurality of time offsets; and
adjusting the timing information of the metadata using the selected time offset.

17. The method of claim 16, wherein the metadata is stored in ID3 tags included in the census data.

18. The method of claim 17, further comprising:
extracting the ID3 tags from the census data; and
decrypting the ID3 tags to obtain the metadata.

19. The method of claim 17, further comprising:
identifying, from the ID3 tags, duplicate ID3 tags; and
discarding the duplicate ID3 tags.

20. The method of claim 16, wherein the metadata of the census data has inaccurate timing information, and wherein the reference data is representative of broadcast data having accurate timing information.

* * * * *